United States Patent Office 3,532,357
Patented Oct. 6, 1970

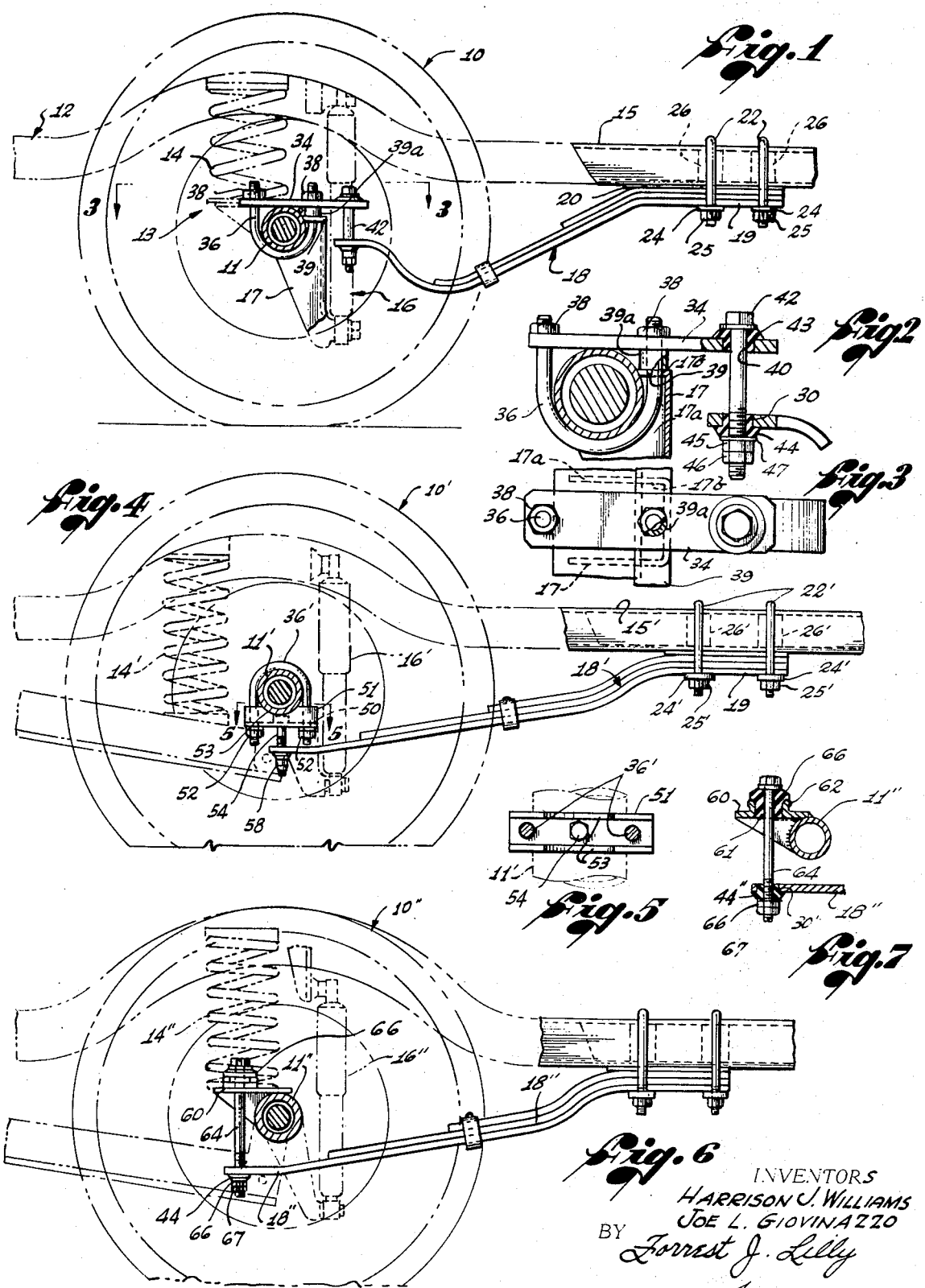

3,532,357
HELPER SPRING FOR AUTOMOTIVE VEHICLE SUSPENSION
Harrison J. Williams, Alhambra, and Joe L. Giovinazzo, Los Angeles, Calif., assignors to Cambria Spring Company, Los Angeles, Calif., a corporation of California
Filed Nov. 29, 1968, Ser. No. 779,785
Int. Cl. B60g 3/00
U.S. Cl. 280—124                                6 Claims

ABSTRACT OF THE DISCLOSURE

A quarter elliptic helper spring for the rear suspension of an automotive vehicle, the spring being adjustably connectible to the axle housing by means of a bolt and nut suspended from a mount on the axle housing, so as to be conveniently adjustable between zero effort for normal ride and increasing amounts of helper effort for greater overloads. The mounting to the axle housing is contrived especially to interfit and cooperate with the initial design of the vehicle, and with such components thereof as the shock absorber, its mounting brackets, the main coil spring, brake fluid lines, etc., such as greatly restrict the space available for installation of a helper spring installation of the present class.

FIELD OF THE INVENTION

This invention relates generally to spring suspension systems for automotive vehicles and the like and, more particularly, to an auxiliary helper or overload spring for such suspension systems.

BACKGROUND OF THE INVENTION

As is well known in the art, spring suspension systems for automotive vehicles are designed for a particular load or load range. The modern trend, particularly in passenger vehicles, is to "soft" springing, for a comfortable ride; and the springs may be designed for a "soft" ride for an assumed maximum load of from two to four passengers. The spring suspension may then be inadequate for loading beyond such maximum. Thus, the greater the loading, or the designed or intended load-carrying capacity of a vehicle, the greater must be the stiffness of the spring suspension system of the vehicle.

In many instances, it is desirable and necessary to use a vehicle with soft springing for transporting loads which are appreciably heavier than the design load of the vehicle's spring suspension system. This occurs most frequently in the case of light trucks, station wagons and passenger vehicles. The springs of a vehicle are excessively deflected under such increased loads, with the result that the chassis is prone to striking the rear axle of the vehicle. In cases of extreme overloading, the vehicle springs may be deflected to such a degree that the chassis of the vehicle rests directly on the axle.

One of the serious deficiencies of many existing auxiliary springs resides in the fact that the vehicles on which auxiliary springs are most frequently used, namely, light trucks, station wagons and passenger vehicles, carry excessive loads only occasionally. Usually the existing auxiliary springs, while capable of supporting these excessive loads, exert their reinforcing action on the spring suspension systems of the vehicles at all times, even when the vehicles are transporting only normal loads. As a result, vehicles so equipped have extremely hard rides under normal loading conditions.

In some cases in the prior art, provision has been made to hold the helper spring out of action excepting when overloads are imposed. These, however, are generally somewhat complicated, with resulting expense, but even more seriously, recent automotive vehicles often have so many closely grouped components in the area of such adjustable helper spring equipment that installation of the latter has in most cases become virtually impossible. A general purpose of the present invention is accordingly the provision of a load adjustable helper spring, of a simple and relatively inexpensive type, which can be accepted within the environments of the rear spring and axle housing of most modern automotive vehicles, while at the same time preserving the road clearance originally provided.

SUMMARY OF THE INVENTION

A study of the rear end suspension of modern automotive vehicles reveals that most of the available space for an auxiliary helper spring has been eliminated, and great ingenuity is now required to devise a helper spring, of the type having adjustment for no-load or loaded conditions, in the available space still remaining. The invention provides a very simple solution to this dilemma. In brief summary, a quarter elliptic multiple leaf spring has been provided and has been fixed at its butt end to the chassis frame, near the rearward extremity of the latter. The thin or single leaf forwardly reaching end of this spring projects into a limited free or unoccupied area underneath, or near and below, the axle housing on each side. A bracket or fixture fixed on the axle housing, above the extremity of the spring, carries the head of a downwardly reaching bolt; and the threaded lower extremity of the spring. A rubber washer, a nut, and a lock nut go on the protruding lower end of this nut, where they are readily accessible. They can easily be reached and set up by a mechanic, or the vehicle owner, at any time that an abnormal load is to be carried. Road clearance is not reduced.

The effect, of course, is to predeflect the quarter elliptic helper spring in an upward direction such that it thereupon offers additional resistance to downward deflection of the frame. The partially deflected helper spring and regular spring of the vehicle then work together to support the load, and the spring system is stiffened for an abnormally heavy load. By the same token, the adjustment nuts of the helper spring can easily be reached and loosened to regain the normal soft-spring ride under normal or average loading.

The spring installation of the invention can also be used to stabilize the suspension against side sway, and also to increase the stiffness of the suspension in such a way as to shift critical frequencies of the suspension out of the speed range of the vehicle.

BRIEF DESCRIPTION OF THE DRAWINGS

FIG. 1 is a side elevational view of a rear suspension system of one commercial manufacturer, with our improved helper spring installed in conjunction therewith;

FIG. 2 is an enlarged detail taken from FIG. 1 with certain parts broken away to show in section;

FIG. 3 is a detailed view, in plan, taken in accordance with line 3—3 of FIG. 2;

FIG. 4 is a view similar to FIG. 1, but showing a modified commercial vehicle suspension and a modified form of the invention provided to operate therewith;

FIG. 5 is a detailed view, in plan, on line 5—5 of FIG. 4, showing a mounting channel;

FIG. 6 is a view similar to FIG. 1 but showing another suspension system, with a modified form of our helper spring applied thereto; and FIG. 7 is a detailed view, taken from FIG. 6, but with parts broken away to show in section.

BRIEF DESCRIPTION OF ILLUSTRATIVE EMBODIMENTS

Referring first to FIGS. 1 and 2 showing an illustration appropriate for a 1968 Ford, among others, a rubber-tired wheel 10 is mounted on an axle in axle housing 11. The frame is designated generally at 12, and supported by the latter is the rearward suspension 13, including coil spring 14 supporting the frame. A shock absorber and its mountings are designated collectively by reference numeral 16. This assembly 16 includes a bracket 17 welded to and depending from the axle housing and adapted at its lower end for support of the lower end of the shock absorber. This bracket, which is of course a part of the original vehicle, is in the shape of a channel 17a as seen in horizontal transverse section, and the channel has a horizontal upper edge 17b, as well known to those skilled in the art.

The quarter elliptic auxiliary helper spring is designated generally at 18. It may be a single leaf, or a tapered bar, etc., but is preferably and here shown as a three-leaf spring, with its butt end 19 fixed to a rearward channel-shaped portion 15 of the frame 12. The butt end 19 is flat and horizontal and engages, through a rubber insulation pad 20, flat against the underside of the frame channel 15, in a region rearward of the rear axle, as illustrated. U-bolts 22 surround the frame members 15 and its two threaded legs reach down to the sides of the channel 15 and the end portion of the spring, to pass through apertures in opposite ends of common cross straps or links 24, below which are nuts 25. Lock washers or jamb nuts, not shown, may be used. The cross straps will be understood to cross the undersides of the springs, so that when the nuts 25 are set up, the springs are securely clamped to the frame. To prevent deformation of the frame, wooden blocks 26 may be inserted in the channel 15.

The spring 18 extends downwardly, from its mounting on the frame, and thence back upwardly and finally horizontally to its forward single leaf extremity, which is furnished with a vertical aperture 30.

A horizontal bracket plate 34 rests on the axle housing and is secured thereto by a U-bolt 36 reaching upwardly from the underside of the axle housing and finally through apertures in the plate 34. The U-bolt interfits within the channel of the suspension bracket 17 for the shock absorber on the 1968 Ford automobile, and can be moved up through this bracket from below, and finally through the plate 34, the leg of the U-bolt nearest the bracket 17 passing through the channel of the bracket. Nuts 38 are screwed onto the threaded ends of the U-bolt, down against the bracket plate 34, so as to secure the assembly tightly on the axle housing. To prevent clockwise rotation of this assembly around the axle housing, when downward spring pressure is exerted on the righthand end of plate 34, the righthand leg of the U-bolt 36 (FIG. 1) is extended through an apertured plate 39 and boss 39a, the plate 39 resting down on the upper edge of the shock absorber bracket 17, with the boss 39a engaging the underside of said plate 34.

The bracket plate 34 projects rearwardly (toward the right in FIG. 1) from the U-bolt to an aperture 40 vertically aligned with the aperture 30 in the extremity of the spring 18. A headed bolt 42 reaches down through the aperture 40, in which is a rubber insulation grommet 43, and thence through the spring aperture 30, in which is a rubber insulation grommet 44. A nut 45 and lock nut 46 on the lower ends of the bolt 42 are set up against the underside of the spring, through washer 47 and grommet 44. These nuts are set up so as to leave the spring 18 relaxed, where no helper spring action is required, or sufficient to place any desired degree of deflection in the spring 18, appropriate to any overload anticipated. When the spring 18 deflects upwardly, its bolt aperture 30 shifts horizontally relative to the bolt aperture 40 in the bracket plate 34. The rubber grommets 43 and 44 are of sufficient flexibility to accommodate this motion of the spring by an angular deflection of the bolt. Adjustment of the device to various loads, or to accomplish a stabilizing action, or a shift of critical frequencies, is very easily accomplished, and the assembly is simple, compact, relatively inexpensive, and interfits within the environment of a substantial fraction of modern automotive vehicles.

FIG. 4 shows a modification, suitable for 1968 Chevrolet automobiles, excepting for the El Camino model. Parts corresponding to the embodiment of FIGS. 1 and 2 will be identified by the same reference, but with primes added in the case of FIG. 4.

The U-bolt 36' at the axle housing in this case goes on the axle housing from the top, passing downwardly through apertures in the bottom wall 50 of each channel-shaped support 51, nuts 52 and suitable washers being screwed onto the lower ends of the U-bolt to secure the assembly tightly onto the axle housing. As illustrated, the side walls of the channel are formed with arcuate depressions 53 to form suitable seating surfaces against the axle housing, the arrangement being such that the bottom wall of the channel 51 is spaced somewhat from the axle housing, as shown. A heated bolt 54 passes downwardly through an aperture in wall 50, the head of the bolt thus engaging the wall 50, and this bolt protrudes through the eye of the extremity of the quarter elliptic spring 18', in substantially exactly the same manner as in the embodiment of FIG. 1. The spring 18', its mounting onto the frame channel 15', and its adjustable rubber-insulated connection with the bolt 54, can be substantially as in FIG. 1, so that no additional detailed description will be necessary. It will be observed that the spring force of the helper spring 18', when the spring is set up by means of adjustment nut 58, is exerted along the center line of the bolt 54 and the axle housing, so there is no tendency for the U-bolt and channel support 51 to rotate on the axle housing. FIG. 4 shows, in phantom lines, other parts of the frame, a main coil suspension spring 14', and a shock absorber assembly 16', inclusive of supporting brackets, the details of which need not be explained. The device of FIG. 4 is suitable, as mentioned above, for 1968 Chevrolet automotive vehicles, and others, excepting for the El Camino and is suitable also for vehicles of similar suspension design. It will be clear that the performance of the device of FIG. 4, including the adjustability to overloads, as well as normal loads, is identical with the embodiment of FIGS. 1–3, and no further discussion should be necessary.

In FIGS. 6 and 7 is a view similar to FIG. 4, but showing a suspension suitable for the 1968 Chevrolet El Camino and vehicles of similar construction. Parts in FIGS. 4 and 5 corresponding to those of FIG. 1 are indicated by the same reference numerals, but with double primes annexed. In this specific case, the main coil suspension spring 14" rests, as the vehicle is manufactured, on a bracket 60 welded to the axle housing 11". This bracket 60 includes an apertures 61, slightly forwardly of the axle housing, surrounded by a rim or bead 62 designed to confine the lower end of he suspension spring 14". This bead 62 is availed of to provide a mounting for the headed bolt 64 used in the present invention for connection to the extremity of the quarter elliptic helper spring 18". As shown in FIG. 6, a rubber grommet 66 is mounted in the bead 62, and receives the shank of bolt 64, as well as supporting the head of the latter. The shank 64 projects downwardly through an eye 30" in the extremity of the spring 18", and an adjustment nut 66 and jamb nut 67 are threaded onto the lower extremity of the bolt 64, below grommet 44".

It will be evident that the helper spring and its adjustment, in the embodiment of FIGS. 6 and 7, are equivalent broadly to the earlier described embodiments, and it will be evident also that we have discovered and provided a helper spring of the quarter elliptic type capable of ready application to the El Camino model of the Chevrolet automobile as manufactured.

We claim:

1. For use on an automotive vehicle including an axle housing, a frame over said axle housing, and a main suspension spring supporting said frame from said axle housing, an auxiliary helper spring device comprising:
   a quarter elliptic spring fixed to said frame at a point spaced longitudinally of the vehicle frame from said axle housing, and projecting from said point to an extremity in proximity to said axle housing, said extremity of said spring having a vertical aperture therethrough,
   a mounting means fixed to said axle housing including an apertured bolt support spaced above said extremity of said spring,
   a headed bolt extending downwardly through the aperture in said bolt support and through said aperture in the extremity of said spring, with the head of said bolt overhanging and supported by said bolt support, and
   a spring adjustment nut threaded on said bolt below said extremity of said spring and adapted to be adjustably set up thereagainst.

2. The subject matter of claim 1, for use on an automotive vehicle having a shock absorber bracket secured to said axle housing, and provided with an upwardly facing portion located in proximity to but rearwardly of the axle housing and shortly below the top side thereof, wherein said mounting means embodies a generally horizontal bracket plate mounted on the top side of the axle housing, an axle U-bolt extending upwardly around said axle housing from below, with its two legs passing through apertures in the bracket plate, nuts threaded on the upper ends of the U-bolt and set down against said axle housing,
   said apertured bolt support comprising the rearward extremity of said bracket plate,
   the rearward leg of said axle housing U-bolt being located intermediate the forward leg thereof and said bolt, and
   a support means surrounding said rearward U-bolt leg, between said bracket plate and said upper edge of said shock absorber bracket, to prevent rotation of said axle U-bolt on said axle owing to a force couple exerted by said helper spring through said bolt and bracket plate.

3. The subject matter of claim 1, wherein said mounting means includes a suspension means secured against the underside of the axle housing, and in which said bolt support comprises an apertured wall of said suspension means spaced below said axle housing, with an aperture in said wall substantially vertically aligned with the center of the axle housing,
   the head of said bolt engaging downwardly on said wall and said bolt protruding through said aperture to the extremity of the helper spring along a substantially vertical line substantially aligned with the center of the axle housing.

4. The subject matter of claim 3, wherein said suspension means is channel-shaped, with the side flanges thereof engaged with axle housing, and a U-bolt engaged downwardly over said axle housing, extending through an aperture in said apertured wall on opposite sides of said previously mentioned aperture, and nuts on the U-bolt set up against the underside of said apertured wall.

5. The subject matter of claim 1, wherein said mounting means comprises a bracket welded to said axle housing and extending forwardly of the vehicle therefrom, said bolt support comprising the forward end portion of said bracket, such that said headed bolt extends downwardly to the extremity of said helper spring at a point forwardly of said axle housing.

6. The subject matter of claim 1, wherein said bolt is fitted with clearance in the aperture in the bolt support and in the aperture in the extremity of the spring, and including flexible rubber grommets in said apertures and around said bolt to permit angular deflection of said bolt in accommodation of horizontal components of movement of the extremity of said spring during deflection thereof.

References Cited

UNITED STATES PATENTS

| 3,302,941 | 2/1967 | Giovinazzo | 267—45 |
| 2,576,935 | 12/1951 | Hayes | 267—17 |
| 1,202,099 | 10/1916 | Randolph | 267—29 |

PHILIP GOODMAN, Primary Examiner

U.S. Cl. X.R.

267—17